(12) United States Patent
Du et al.

(10) Patent No.: US 11,954,122 B2
(45) Date of Patent: *Apr. 9, 2024

(54) IN-MEMORY DATABASE-MANAGED CONTAINER VOLUME REPLICATION

(71) Applicant: SAP SE, Walldorf (DE)

(72) Inventors: Long Du, Xi'an (CN); Yu Wang, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,468

(22) Filed: Jan. 23, 2023

(65) Prior Publication Data

US 2023/0161794 A1 May 25, 2023

Related U.S. Application Data

(63) Continuation of application No. 17/219,094, filed on Mar. 31, 2021, now Pat. No. 11,625,418, which is a
(Continued)

(51) Int. Cl.
| | | |
|---|---|---|
| *G06F 16/20* | (2019.01) | |
| *G06F 9/50* | (2006.01) | |
| *G06F 9/54* | (2006.01) | |
| *G06F 11/14* | (2006.01) | |
| *G06F 16/23* | (2019.01) | |

(Continued)

(52) U.S. Cl.
CPC .......... *G06F 16/273* (2019.01); *G06F 9/5072* (2013.01); *G06F 9/544* (2013.01); *G06F 11/1471* (2013.01); *G06F 11/1484* (2013.01); *G06F 16/2308* (2019.01); *G06F 16/2365* (2019.01); *H04L 69/40* (2013.01); *G06F 2201/815* (2013.01); *G06F 2201/82* (2013.01)

(58) Field of Classification Search
None
See application file for complete search history.

(56) References Cited

U.S. PATENT DOCUMENTS 6,751,794 B1     6/2004  Mccaleb et al.
7,305,421 B2 *  12/2007  Cha ..................... G06F 11/2094
(Continued)

OTHER PUBLICATIONS

"U.S. Appl. No. 16/274,742, Notice of Allowance dated Jan. 22, 2021", 9 pgs.
(Continued)

*Primary Examiner* — Belix M Ortiz Ditren
(74) *Attorney, Agent, or Firm* — SCHWEGMAN LUNDBERG & WOESSNER, P.A.

(57) ABSTRACT

In an example embodiment, a solution is used to provide container volume replication via a container storage replication log and volume buffer synchronization, which is built on top of a container cloud platform whose container metadata and replication runtime configuration are all managed by a storage manager (a service orchestrated by its job scheduler and service orchestrator). This container volume replication ensures the data security for a long-running service in the container. In the case of any disaster, the in-memory database and application data inside of the container can be recovered via volume replication. This provides container volume replication for long-running containerized applications whose states keep changing.

20 Claims, 8 Drawing Sheets

Related U.S. Application Data continuation of application No. 16/274,742, filed on Feb. 13, 2019, now Pat. No. 10,997,208.

(51) Int. Cl.
*G06F 16/27* (2019.01)
*H04L 69/40* (2022.01)

(56) References Cited

U.S. PATENT DOCUMENTS

| | | | |
|---|---|---|---|
| 9,218,251 B1* | 12/2015 | Hemashekar | G06F 11/1456 |
| 9,330,155 B1* | 5/2016 | Bono | G06F 16/1787 |
| 9,418,003 B2 | 8/2016 | Hunt et al. | |
| 10,289,690 B1* | 5/2019 | Bono | G06F 16/184 |
| 10,599,354 B1 | 3/2020 | Greenwood et al. | |
| 10,997,208 B2 | 5/2021 | Du et al. | |
| 11,403,320 B2 | 8/2022 | Wang et al. | |
| 11,422,973 B2 | 8/2022 | Wang et al. | |
| 11,625,418 B2 | 4/2023 | Du et al. | |
| 11,803,514 B2 | 10/2023 | Wang et al. | |
| 2006/0235730 A1 | 10/2006 | Politano et al. | |
| 2007/0136297 A1 | 6/2007 | Choe | |
| 2008/0104132 A1* | 5/2008 | Toner | G06F 16/119 |
| 2008/0162490 A1 | 7/2008 | Becker et al. | |
| 2011/0276584 A1 | 11/2011 | Cotner et al. | |
| 2013/0276070 A1 | 10/2013 | Lee | |
| 2014/0244585 A1 | 8/2014 | Sivasubramanian et al. | |
| 2014/0359463 A1 | 12/2014 | Schaus | |
| 2016/0072895 A1 | 3/2016 | Bailey | |
| 2017/0116043 A1 | 4/2017 | Muthulingam et al. | |
| 2017/0219357 A1 | 8/2017 | Pfeifle | |
| 2017/0244593 A1* | 8/2017 | Rangasamy | H04L 43/20 |
| 2017/0351695 A1 | 12/2017 | Rao et al. | |
| 2018/0143856 A1 | 5/2018 | Du et al. | |
| 2018/0146067 A1 | 5/2018 | Du et al. | |
| 2018/0146069 A1 | 5/2018 | Du et al. | |
| 2018/0189121 A1 | 7/2018 | Jobi et al. | |
| 2018/0205652 A1 | 7/2018 | Saxena | |
| 2018/0278725 A1 | 9/2018 | Thayer | |
| 2019/0156047 A1 | 5/2019 | Daniel et al. | |
| 2019/0163469 A1 | 5/2019 | Sreenivasa et al. | |
| 2019/0294722 A1 | 9/2019 | Mohan | |
| 2019/0303127 A1 | 10/2019 | Krishnaswamy et al. | |
| 2020/0183035 A1 | 6/2020 | Liu et al. | |
| 2020/0241864 A1 | 7/2020 | Duvur et al. | |
| 2020/0249928 A1 | 8/2020 | Zeng et al. | |
| 2020/0257704 A1 | 8/2020 | Du et al. | |
| 2020/0285610 A1 | 9/2020 | Wang et al. | |
| 2020/0285652 A1 | 9/2020 | Wang et al. | |
| 2021/0084537 A1 | 3/2021 | Zhang et al. | |
| 2021/0216570 A1 | 7/2021 | Du et al. | |
| 2022/0253459 A1 | 8/2022 | Wang et al. | |
| 2022/0318189 A1 | 10/2022 | Wang et al. | |

OTHER PUBLICATIONS

"U.S. Appl. No. 16/294,570, Examiner Interview Summary dated Jan. 13, 2022", 2 pgs.
"U.S. Appl. No. 16/294,570, Examiner Interview Summary dated Mar. 18, 2022", 3 pgs.
"U.S. Appl. No. 16/294,570, Final Office Action dated Feb. 23, 2022", 21 pgs.
"U.S. Appl. No. 16/294,570, Non Final Office Action dated Dec. 7, 2021", 20 pgs.
"U.S. Appl. No. 16/294,570, Notice of Allowance dated Mar. 30, 2022", 13 pgs.
"U.S. Appl. No. 16/294,570, Response filed Jan. 13, 2022 to Non Final Office Action dated Dec. 7, 2021", 13 pgs.
"U.S. Appl. No. 16/294,570, Response filed Mar. 16, 2022 to Final Office Action dated Feb. 23, 2022", 13 pgs.
"U.S. Appl. No. 16/294,570, Supplemental Notice of Allowability dated Jul. 7, 2022", 2 pgs.
"U.S. Appl. No. 16/294,658, Examiner Interview Summary dated Jan. 13, 2022", 2 pgs.
"U.S. Appl. No. 16/294,658, Examiner Interview Summary dated Mar. 18, 2022", 2 pgs.
"U.S. Appl. No. 16/294,658, Final Office Action dated Feb. 24, 2022", 21 pgs.
"U.S. Appl. No. 16/294,658, Non Final Office Action dated Dec. 17, 2021", 18 pgs.
"U.S. Appl. No. 16/294,658, Notice of Allowance dated Apr. 13, 2022", 13 pgs.
"U.S. Appl. No. 16/294,658, Response filed Jan. 13, 2022 to Non Final Office Action dated Dec. 17, 2021", 10 pgs.
"U.S. Appl. No. 16/294,658, Response filed Mar. 16, 2022 to Final Office Action dated Feb. 24, 2022", 13 pgs.
"U.S. Appl. No. 16/294,658, Supplemental Notice of Allowability dated Apr. 22, 2022", 2 pgs.
"U.S. Appl. No. 17/219,094, Non Final Office Action dated Jun. 27, 2022", 7 pgs.
"U.S. Appl. No. 17/219,094, Notice of Allowance dated Dec. 7, 2022", 9 pgs.
"U.S. Appl. No. 17/219,094, Response filed Aug. 15, 2022 to to Non Final Office Action dated Jun. 27, 2022", 7 pgs.
"U.S. Appl. No. 17/728,768, Non Final Office Action dated Jan. 20, 2023", 21 pgs.
"GitHub—docker/distribution: The Docker toolset to pack, ship, store, and deliver content", [Online]. Retrieved from the Internet: <URL: https://github.com/docker/distribution>, (Accessed Jan. 27, 2019), 4 pgs.
"Google Container Registry—Secure, Private Docker Registry", [Online]. Retrieved from the Internet: <URL: https://cloud.google.com/container-registry/>, (Accessed Jan. 27, 2019), 7 pgs.
"Google URL Shortener", [Online]. Retrieved from the Internet: <URL: goo.gl/>, (Accessed Jan. 27, 2019), 2 pgs.
"IBM Cloud Docs", [Online]. Retrieved from the Internet: <URL: https://console.bluemix.net/docs/>, (Accessed Jan. 27, 2019), 4 pgs.
"Oracle Database Provisioning", Enterprise Manager Lifecycles Management Administrator's Guide, [Online]. Retrieved from the Internet: <URL: https://docs.oracle.com/cd/E24628_01/em.121/e27046/prov_db_overview.htm#EMLCM11094>, (2019), 30 pgs.
"Peer-to-peer", Wikipedia, http://en.wikipedia.org/wiki/Peer_to_peer, (Aug. 1, 2006), 7 pages.
Anwar, Ali, et al., "Improving Docker Registry Design based on Production Workload Analysis", 16th USENIX Conference on File and Storage Technologies, [Online]. Retrieved from the Internet: <URL: https://www.usenix.org/system/files/conference/fast18/fast18-anwar.pdf>, (2018), 265-278.
Bligh, Alex, "Distributed Storage: Heads in the Cloud", Flexiant IP Ltd., [Online]. Retrieved from the Internet: <URL: https://www.flexiant.com/2013/07/26/what-is-distributed-storage-and-why-use-it-part-2/>, (Jul. 26, 2013), 5 pgs.
Cecchet, Emmanuel, et al., "Dolly: Virtualization-driven Database Provisioning for the Cloud", International Conference on Virtual Execution Environments, (2011), 51-62.
Ekici, Erhan, "Microservices Architecture, Containers and Docker.", IBM—Software Defined Environments Technical Blog, [Online]. Retrieved from the Internet: <URL:https://www.ibm.com/developerworks/community/blogs/1ba56fe3-efad-432f-a1ab-58ba39 . . . >, (Dec. 8, 2014), 4 pgs.
Schneider, Eric, "Multitenancy", [Online]. Retrieved from the Internet: <URL: https://archive.sap.com/documents/docs/DOC-59771>, (2015), 3 pgs.
Venumbaka, Saiprashanth, "SAP HANA Multitenant Database Containers", [Online]. Retrieved from the Internet: <URL: https://blogs.saphana.com/2015/01/27/sap-hana-multitenant-database-containers/>, (2015), 3 pgs.
"U.S. Appl. No. 17/728,768, Examiner Interview Summary dated Feb. 13, 2023", 3 pgs.
"U.S. Appl. No. 17/728,768, Examiner Interview Summary dated May 1, 2023", 2 pgs.
"U.S. Appl. No. 17/728,768, Examiner Interview Summary dated Jul. 27, 2023", 2 pgs.
"U.S. Appl. No. 17/728,768, Final Office Action dated Mar. 20, 2023", 19 pgs.

(56) References Cited

OTHER PUBLICATIONS

"U.S. Appl. No. 17/728,768, Non Final Office Action dated May 24, 2023", 18 pgs.
"U.S. Appl. No. 17/728,768, Response filed Feb. 10, 2023 to Non Final Office Action dated Jan. 20, 2023", 10 pgs.
"U.S. Appl. No. 17/728,768, Response filed Apr. 28, 2023 to Final Office Action dated Mar. 20, 2023", 14 pgs.
"U.S. Appl. No. 17/728,768, Response filed Jul. 26, 2023 to Non Final Office Action dated May 24, 2023", 9 pgs.
"U.S. Appl. No. 17/843,600, Examiner Interview Summary dated Mar. 3, 2023", 2 pgs.
"U.S. Appl. No. 17/843,600, Examiner Interview Summary dated May 30, 2023", 3 pgs.
"U.S. Appl. No. 17/843,600, Final Office Action dated Apr. 21, 2023", 24 pgs.
"U.S. Appl. No. 17/843,600, Non Final Office Action dated Feb. 16, 2023", 24 pgs.
"U.S. Appl. No. 17/843,600, Notice of Allowance dated Jun. 20, 2023", 11 pgs.
"U.S. Appl. No. 17/843,600, Response filed Mar. 8, 2023 to Non Final Office Action dated Feb. 16, 2023", 14 pgs.
"U.S. Appl. No. 17/843,600, Response filed May 25, 2023 to Final Office Action dated Apr. 21, 2023", 13 pgs.
U.S. Appl. No. 16/274,742 U.S. Pat. No. 10,997,208, filed Feb. 13, 2019, In-Memory Database-Managed Container Volume Replication.
U.S. Appl. No. 17/219,094 U.S. Pat. No. 11,625,418, filed Mar. 31, 2021, In-Memory Database-Managed Container Volume Replication.
U.S. Appl. No. 16/294,570 U.S. Pat. No. 11,403,320, filed Mar. 6, 2019, Elastic In-Memory Database Provisioning on Database-as-a-Service.
U.S. Appl. No. 17/728,768, filed Apr. 25, 2022, Elastic In-Memory Database Provisioning on Database-as-a-Service.
U.S. Appl. No. 16/294,658 U.S. Pat. No. 11,422,973, filed Mar. 6, 2019, Peer-to-Peer Delta Image Dispatch System.
U.S. Appl. No. 17/843,600, filed Jun. 17, 2022, Peer-to-Peer Delta Image Dispatch System.
"U.S. Appl. No. 17/728,768, Notice of Allowance dated Oct. 2, 2023", 12 pgs.
"U.S. Appl. No. 17/843,600, Supplemental Notice of Allowability dated Oct. 4, 2023", 2 pgs.
"U.S. Appl. No. 17/728,768, Corrected Notice of Allowability dated Oct. 13, 2023", 2 pgs.

\* cited by examiner

IN-MEMORY DATABASE-MANAGED CONTAINER VOLUME REPLICATION

CROSS-REFERENCE TO RELATED APPLICATIONS

This application is a continuation of prior application Ser. No. 17/219,094, filed on Mar. 31, 2021, which is a continuation of prior application Ser. No. 16/274,742, filed on Feb. 13, 2019, which applications are incorporated by reference herein in their entirety.

TECHNICAL FIELD

This document generally relates to systems and methods for in-memory databases. More specifically, this document relates to in-memory database-managed container volume replication.

BACKGROUND

An in-memory database is a database management system that primarily relies on main memory of a computer system for storage. It is contrasted with database management systems that employ a disk-storage mechanism. One example of an in-memory database is HANA™, from SAP SE of Walldorf, Germany.

Containerization of software applications has become a more popular mechanism for distributing software applications in recent years. Containerization is an operating system-level virtualization method that allows distributed applications to be deployed and run without launching an entire virtual machine for each application. Multiple isolated applications or services run on a single host and access the same operating system kernel.

Application containers include runtime components, such as files, environment variables, and libraries, needed to run the desired software applications. Application containers consume fewer resources than comparable deployments on virtual machines because containers are able to share resources without a full operating system to underpin each application. The complete set of information to execute in a container is called the image. The container engine deploys these images on hosts.

One technical issue that arises with deployments of containerized software applications, such as containerized microservices, in a datacenter is ensuring high availability of the container from various system levels. When an application container is deployed on a datacenter, a framework to support long-running service is provided. When there is corruption on the container, the framework reschedules the image for another running container. This, however, is not suitable for those applications whose state is changing all the time, as a re-run container will not recover the original state that was lost during the corruption. There is thus a need for a solution that would allow for container-level consistency with operating system and application state to be maintained.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a solution is used to provide container volume replication via a container storage replication log and volume buffer synchronization, which is built on top of a container cloud platform whose container metadata and replication runtime configuration are all managed by a storage manager (a service orchestrated by its job scheduler and service orchestrator). This container volume replication ensures the data security for a long-running service in the container. In the case of any disaster, the in-memory database and application data inside of the container can be recovered via volume replication. This provides container volume replication for long-running containerized applications whose states keep changing.

Figure 1:
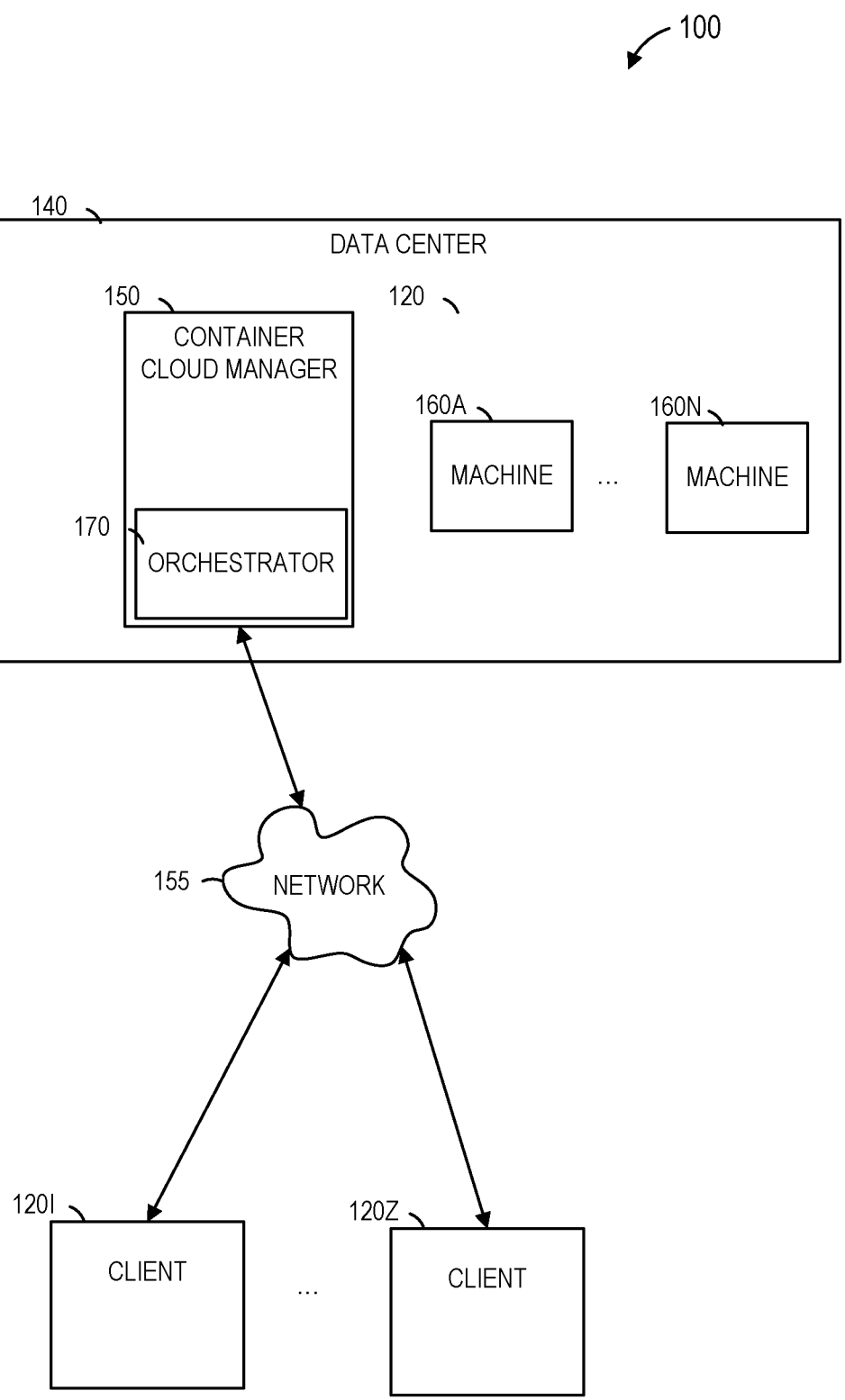
FIG. 1 is a block diagram illustrating an exemplary architecture, in accordance with an example embodiment.

FIG. 1 is a block diagram illustrating an exemplary architecture 100, in accordance with an example embodiment. Architecture 100 may have a distributed architecture. In one example implementation, the environment includes a data center 140. The data center 140 provides various services to users. The data center 140 and services form a cloud platform. The cloud platform, for example, may be Cloud Foundry. Other types of cloud platforms may also be useful.

The data center 140 includes numerous interconnected servers. For example, the servers are connected through a communication network 155. The communication network 155 may be an internet, an intranet, a local area network (LAN), a wide area network (WAN) or a combination thereof. Other types of connections may also be useful.

A plurality of clients, such as client 120*i* to client 120*z*, may access the data center 140 through a communication network 155. The value z represents the number of clients 120. The communication network 155 may be an internet or a WiFi communication network. Other types of communication networks 155, such as an intranet or a combination of different types of communication networks 155 may also be useful. Other techniques for communicating with the data center 140 by the clients 120 may also be useful. Access to the data center 140 may require a user account and password. Other types of security measures may also be implemented.

A client 120 may be a local or remote computing device with, for example, a local memory and a processor. The memory may include fixed and/or removable non-transitory computer-readable media, such as a magnetic computer disk, CD-ROM, or other suitable media. Various types of processing devices may serve as a client 120. For example, the client 120 may be a PC, a tablet PC, a workstation, a network computer, a kiosk or a mobile computing device, such as a laptop, a tablet or a smart phone. Other types of processing devices may also be used. The client 120 can receive, transmit, process and store any appropriate data associated with the architecture.

Clients 1201-120Z may access the data center 140 for various reasons. In one embodiment, clients 120 may include developer clients and user clients. For example, developer clients develop applications (Apps) for the data center 140. In one example embodiment, the developer clients may be developing apps for a cloud platform or cloud foundry. As for user clients, they access the data center 140 to utilize various available apps. Other types of clients 120 may also be included. For example, a front-end portion of an app, which is selected for installation, is loaded onto the client device. When invoked by the user, the back-end portion of the app runs in the data center 140, based on instructions by the user client. The results are presented to the user on the user device.

As for the data center 140, a server may be a computer which includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. A server, for example, is a host in the data center 140 and does not include a display device. Other types and configurations of servers may also be useful.

As shown, the data center 140 includes a container cloud manager 150. The container cloud manager 150 manages the resources of the data center 140, which includes a plurality of machines, such as machine 160A to machine 160N. The value N represents the number of machines 160 in a data center 140. It is understood that in a data center 140, N may be a very large number. For example, N may be about in the magnitude of thousands or even more. The number N may depend on, for example, the size of the data center 140. Other values of N may also be useful. The value of n may be dynamic. For example, N machines 160 may be expanded or contracted based on requirements. The container cloud manager 150 and machines 160a-160n, for example, are servers. The container cloud manager 150 serves the role of a manager while machines 160 serve the role of workers. Other configurations of container cloud manager 150 and machines 160A-160N may also be useful.

The various components of the data center 140, such as the container cloud manager 150 and machines 160A-160N, as discussed, are interconnected. The components may be distributed over different locations. For example, the components may be distributed across different buildings. The different buildings may be proximately distributed, for example, in a city. A building may be provided with its own back-up power source. Providing back-up power source ensures undisturbed operation of the data center 140 during a power outage. As for components of the data center 140, they may be distributed into different racks in a building. Power outage to one rack or defects of a rack will not affect the operation of all other racks.

In one example embodiment, the container cloud manager 150 includes a storage master and a master database. In one embodiment, the master database may be a HANA database. For example, the master database may include a HANA XE Engine. Other types of databases may also be useful. In one embodiment, the container cloud manager 150 includes multiple copies or replications. For example, the container cloud manager 150 includes an original (master), second and third replications. Providing other numbers of copies may also be useful. In one embodiment, the cloud manager involves HANA System Replication (HANA SR). The container cloud manager 150 and replications will be subsequently discussed in greater detail.

In one example embodiment, the container cloud manager 150 is embedded with application level container framework. For example, the container cloud manager 150 and its replications work as a container framework. In one example embodiment, the container framework is a Docker framework. For example, the container cloud manager 150 and its replications work as a Docker framework. Other types of container frameworks may also be useful. For example, container frameworks, such as LXC or Rocket container frameworks may also be useful. Docker, for example, is embedded with the master database. This enables management of containers and cloud application (app) images of the data center 140. As will be subsequently discussed, apps are stored as app images in the data center 140 and the app images are run in the containers. The container cloud manager 150, in one example embodiment, employs a container service, such as a Docker service, to manage containers and app images of the data center 140. Other types of container services may also useful. In one embodiment, Docker is embedded with HANA SR master database, enabling management of containers and app images of the data center 140.

The framework, including container cloud manager 150, containers and app images serves as a cloud platform. For example, the cloud platform offers container service to customers. The container service in the cloud platform may be referred to as a container cloud. The container cloud may be a cloud foundry. As for the machines 160, they are hosts which serve as the resources for the data center 140. The container cloud manager 150 manages the resources of the data center 140. For example, the machines 160 are employed to build, package and deploy cloud Apps.

The container framework, such as Docker framework, may be a tool, an infrastructure, or an architecture used to build, deploy and run apps using containers. In one example embodiment, the container cloud manager 150 embedded with the container framework supports "one-build, run-everywhere" concept or function. In "one-build, run-everywhere", a customized app needs only to be built once. For example, a new app is built if it does not already exist in the data center 140. This is the one-build part of the "one-build, run-everywhere" function. Once the new app is built, its app image is stored in the data center 140. Subsequently, when a user searches the app, the user can find the app image and do whatever the user desires. In other words, the app can run everywhere. For example, this is the run-everywhere part of the "one-build, run-everywhere" function.

In one embodiment, the one-build function is supported by a build tool. In one embodiment, the build tool is a Jenkins build tool. Other types of build tools may also be useful. The build tool, for example, is a stand-alone tool. The build tool may run on any data center servers. A build is performed when a new app is released. For example, when a new app is delivered, it triggers the build tool to perform a new build using Docker. In one embodiment, the storage master searches the master database to see if the app already exists in the data center 140. If it does not, it triggers the build tool to initiate a build. For example, the container build is in the Jenkins build process. The container cloud manager 150 maintains information of machines 160 in the data center 140. For example, machines 160 which support Docker are maintained in the master database. The container cloud manager 150 selects a machine 160A-160N that supports Docker to build the app. The storage master and master database work together as the Docker framework. For example, the storage master and HANA SR of the container cloud manager 150 works as the Docker framework.

The build includes generating an image of the app. A container is also built as part of the build process. The container, for example, is the runtime of the app image. The app image includes container configurations. For example, the container is configured with necessary dependencies and functions, and packed back to the app image. In one example embodiment, the app image includes configurations for a Docker container. The framework may also support other types of containers. For example, app image may include configurations for other types of containers, such as LXC or Rocket. The container runs when the app is started. For example, the container starts based on the app image. The container isolates the app from the host and ensures that the app will run on any machines 160 of the data center 140, regardless of any customized settings.

After the build is completed, information of the app image is registered with the master database of the container cloud manager 150. In one example embodiment, information of the x copies of the app image is registered in the master database, such as HANA master database. In one example embodiment, 3 copies of the app image are stored in the data center 140 (e.g., x=3). Other values of x may also be useful. Excess copies greater than x are deleted from the data center 140. Each copy of the app image is stored in a different host of the data center 140. Such information may include app image information, including name, version, and host location where the images are stored. The app image is stored in the data center 140. Once the app exists in the data center 140, no additional build is performed. As such, only one build is needed for the app.

In an example embodiment, when a new app is released, a new container is created. For example, a new app release involves creating a new app image and a new container. The container is configured and packed back to the app image. Intermediate container or containers are deleted, leaving the app image. The container cloud manager 150 encapsulates container service, such as Docker service. Other types of container services may also be useful. For example, the Docker command interface is encapsulated as a library for further development. Encapsulating or embedding the Docker service enables transparent operation by the user, such as using a Linux command line directly. Also, Docker service supports some container changes or modifications. Such changes include, for example, specifying which host runs the app, Secure Shell (SSH) configuration and batch operation on Docker. Other types of changes or modifications may also be useful. Encapsulation of Docker services is achieved using library interfaces. The library interfaces can be used in various conditions. This enables further development. For example, a user, such as a developer, can use the library to build additional images or containers. Other types of users may also utilize the library interfaces. The user can employ the library interfaces as part of App development, App testing and App release as well as other purposes.

In one example embodiment, the container cloud manager 150 includes an orchestrator 170. The orchestrator 170 may include a flexible job scheduler and an operator pool.

The flexible job scheduler and container cloud manager 150 form a flexible job management platform for managing jobs of the data center 140. In one embodiment, flexible job management platform is based on embedded HANA container service, such as Docker service. The flexible job management framework can isolate various types of jobs as well as mix various jobs for efficient usage of hosts or resources in the data center 140, including build jobs.

The container framework, such as Docker framework, which includes chronos or borg, is well designed for container based job management. For example, the job scheduler can integrate the container framework to efficiently manage the container cloud. The container based job management supports fault tolerance, job pre-emption or other job management functions. In one example embodiment, a container cloud manager 150 includes a flexible job scheduler. The flexible job scheduler leverages the data center 140's resources, including networking, memory, CPU usage for hosts load balance by utilizing hybrid job scheduling.

In addition, the flexible job scheduler enables monitoring and analysis of jobs utilizing container service, such as Docker service. Since the container isolates the internal status of the job from the host status, the scheduler, which is on a remote host from that running the job, needs to establish a SSH tunnel from the host of the container cloud manager 150 in order to receive status update of the job. However, by utilizing the Docker container command from the library of commands, the scheduler, which is on a remote host from that running the job, can access the host to obtain the job status. As such, the job management framework provides efficient utilization of data center resources.

As discussed, the job scheduler performs job management functions. As discussed, jobs run in containers and numerous jobs can be actively run at one time in the data center 140. In addition, there may be different types of jobs having different priorities. The job scheduler manages the requested jobs on the container cloud. The job management functions include scheduling, monitoring, and pre-emption of jobs. For example, the job scheduler schedules jobs as requested. The schedule is made based on priority and types of jobs. As for monitoring, the job scheduler monitors job status, such as pending, started, running, finished, failed, killed or lost. In addition, the job scheduler monitors resources of the data center 140, such as resource usage status, such as memory usage, disk usage and CPU usage of all the hosts of the data center 140. The job scheduler may perform job pre-emption by evicting or shifting lower priority jobs and replacing with higher priority jobs. In other words, job pre-emption relates to reorganizing the job schedule based on priority when new and higher priority jobs are requested.

The job scheduler may perform other job management functions. Other job management functions include, rescheduling or re-running jobs when incurs a failure or is intentionally killed, managing clusters of hosts which are designated for specific jobs, as well as managing jobs which run on multiple hosts. For example, some hosts may be clustered into a pool for a specific or exclusive type of job. The data center 140 may include one or more clusters, each for a specific type of job. For a job which runs on multiple hosts, the job scheduler organizes and schedules the job on a group of hosts.

As discussed, the data center 140 receives various types or categories of job requests. The categories of job requests include batch jobs, test jobs, immediate jobs and online jobs. Batch jobs refer to large jobs which are not required within a short time. For example, batch jobs may include analysis of enterprise sales data. Test jobs relate to testing various types of tests, such as unit testing, functional testing, and performance testing by developer users. Online jobs include interactive operations. Such jobs are required to be performed almost instantaneously. As for immediate jobs, they are required to be performed within a very short time. Such jobs may include a fast function check or a component function verification. For example, such jobs should be performed within tens of seconds.

As for the operator pool, it contains optional components of the database for various support services. For example, the operator pool contains optional components of HANA database as services. In the case of HANA databases, such components may include, for example, geographical information system (GIS), predictive analysis library (PAL), application function library (AFL), dynamic tiering (DT), HANA system replication (HANA SR), text mining, R language integration, HANA cockpit, HANA python support, HANA test pack support and HANA mock test support. Providing other components may also be useful. For example, HANA may include many more optional components. In addition, non-HANA database components may also be useful for other types of databases.

In one example embodiment, the data center 140 maintains all base core images of a database. In one example embodiment, the data center 140 maintains all base core images of HANA database. Maintaining core images of other databases may also be useful. A user may select the desired version of the database and select microservices for customization. For example, a user may select the operators from the operator pool for customizing the database. In one example embodiment, a user may customize a selected version of the HANA database with desired microservices selected from the operator pool.

Figure 2:
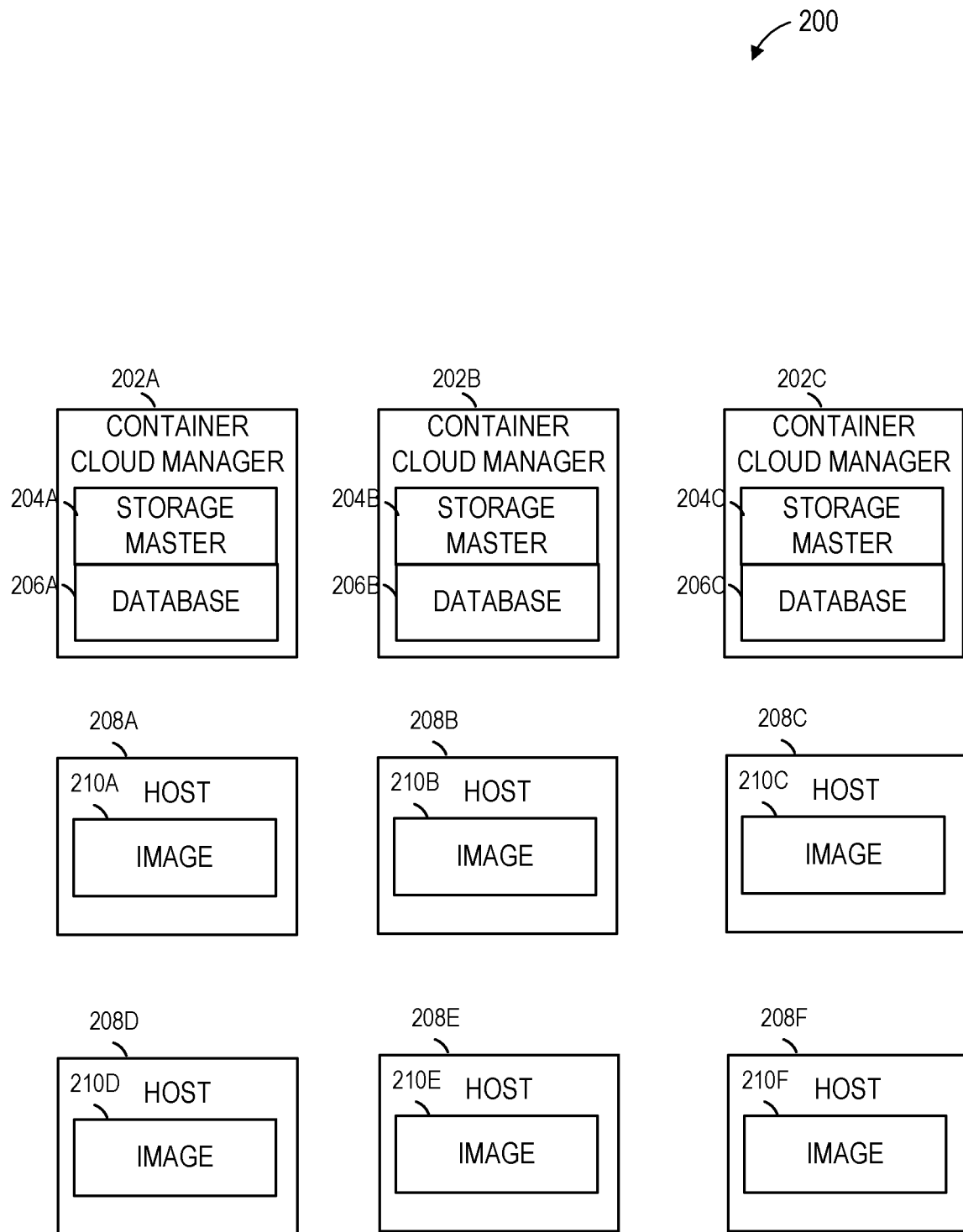
FIG. 2 shows a simplified distributed app image and container management architecture of a data center, in accordance with an example embodiment.

FIG. 2 shows a simplified distributed app image and container management architecture 200 of a data center 140, in accordance with an example embodiment. The distributed management architecture includes y multiple container cloud managers 150, such as container cloud managers 202A-202C. In one embodiment, y=3. For example, the distributed management architecture includes container cloud managers 202A-202C. Providing other numbers of container cloud managers 202A-202C may also be useful. In one example embodiment, the first container cloud manager 202A may be referred to as the master while the second and third container cloud managers 202B, 202C may be referred to as the second and third replications. As discussed, each container cloud manager 202A-202C includes a storage master 204A-204C and a master database 206A-206C. In one example embodiment, a container cloud manager 202A-202C also includes an orchestrator 170. The orchestrator 170 includes a job scheduler and an operator pool.

In one embodiment, the storage master 204A-204C is bundled with HANA SR. For example, the storage master 204A-204C and HANA work as the container cloud manager 202 to manage containers, such as Docker and/or other types of containers. This enables high availability due to the master and first and second replications. The master and the second replication are connected using a synchronization mode connection. For example, all information from the master is updated and maintained in the master database 206 of the second replication. The second replication and the third replication are connected using an asynchronous mode of connection. For example, information from the second replication may not be immediately updated in the master database 206 of the third replication.

As also shown, the architecture 200 includes n plurality of hosts 208A-F. Illustratively, only six hosts 208A-208F are shown for simplicity. However, it is understood that the architecture 200 may include a large number of hosts 208. Also, as already discussed, the hosts may 208A-208F be distributed and need not be located in the same location. In addition, the hosts 208A-208F may be grouped into clusters. For example, a cluster is a pool of hosts 208A-208F for exclusive usage. In other cases, all the hosts 208A-208F of the architecture 200 may be a single cluster. In other words, the architecture 200 is made of one or more pool of hosts 208A-208F, a pool of hosts 208A-208F can be one or more hosts 208 for exclusive usage. Other configurations of clusters may also be useful. For example, some pools of hosts 208A-208F are exclusively used during the day while others may be available at night.

The container cloud manager 202A-202C manages the resources of the architecture 200. In one embodiment, the first or master container cloud manger 202A may be the primary container cloud manager 202. In the event the master container cloud manager 202A is down, responsibility of data center management transfers to the second storage manager 202B. For example, the second container cloud manager 202B serves as a backup for the master container cloud manager 202A. The second replication effectively becomes the new master while the old master becomes the new second replication. This enables the restoration of the old master container cloud manager 202A without a service interruption.

In the event that both the first and second container cloud managers 202A, 202B are down, the third container cloud manager 202C serves as a disaster recovery system. For example, disaster recovery is performed to bring the first and second data managers 202A, 202B back on-line. In one embodiment, data from the third container cloud manager 202C is used to restore the first or second container cloud manager 202A, 202B to its previous state. Once the first container cloud manager 202A is back on-line, the other cloud manager 202B may be restored. Other configurations of providing backup in the case of one of the container cloud managers 202A-202C is down may also be useful.

In one example embodiment, the storage master 204A-204C can access all hosts 208A-208F of the architecture 200. The storage master 204A-204C accesses the hosts 208A-208F by, for example, using a user and password which is maintained in the master database 206. When a new build requests is initiated, the storage master 204A-204C requests host resource utilization information and selects a host 208 which can support and perform the build. For example, the master database 206 includes a list of hosts 208 which support the Docker build. The storage master 204A-

204C, from the list, selects the host 208A-208F with the most resources available. For example, the host 208 with the biggest memory, biggest disk size and largest number of CPUs is selected. The build generates, in one embodiment, 6 copies of an app image 210A-210F. Generating other number of copies of an app image 210 may also be useful. As already discussed, an app image 210 includes a container packed backed to it.

Figure 3:
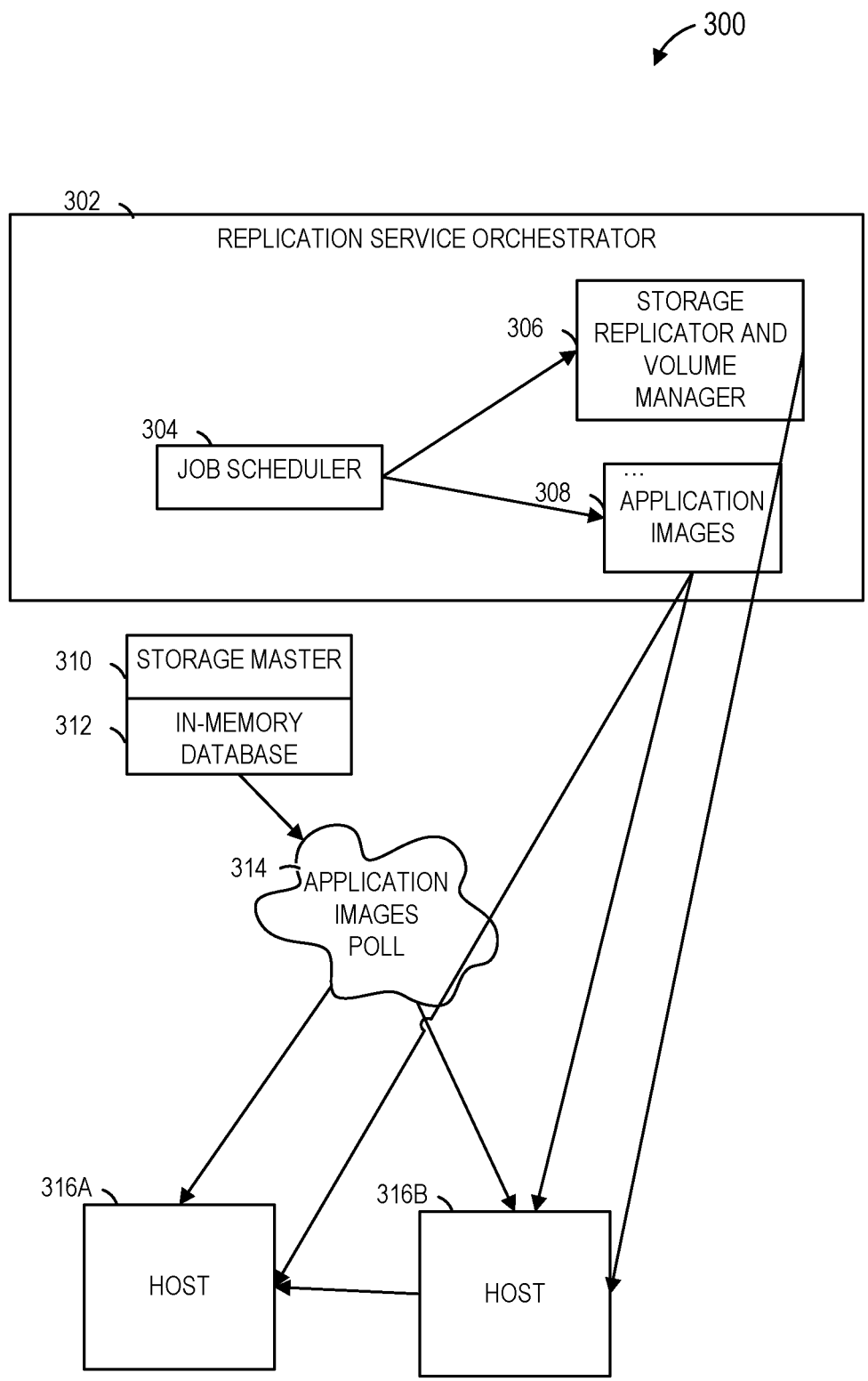
FIG. 3 is a block diagram illustrating a system for handling a containerized application whose state keeps changing, in accordance with an example embodiment.

FIG. 3 is a block diagram illustrating a system 300 for handling a containerized application whose state keeps changing, in accordance with an example embodiment. The system 300 includes a replication service orchestrator 302 containing a job scheduler 304, storage replicator and volume manager 306, and one or more application images 308. The system 300 also includes a storage master 310, an in-memory database 312, and application images poll 314, and multiple deployments 316A, 316B of each application image on at least two hosts 208.

The system 300 provides a three-tier architecture. The container replication service is provided as a microservice by a container microservice orchestrator. In-memory database images and application images 308 are distributed in datacenters 140. The replication service is triggered via restful application program interface (API) calls from the client 120.

All container volumes' metadata are recorded on an in-memory database 312 under a storage manager, which specifies the volume id and relative container. Once container replication is established, the images' replication information is also recorded in the in-memory database 312 under the storage manager.

Figure 4:
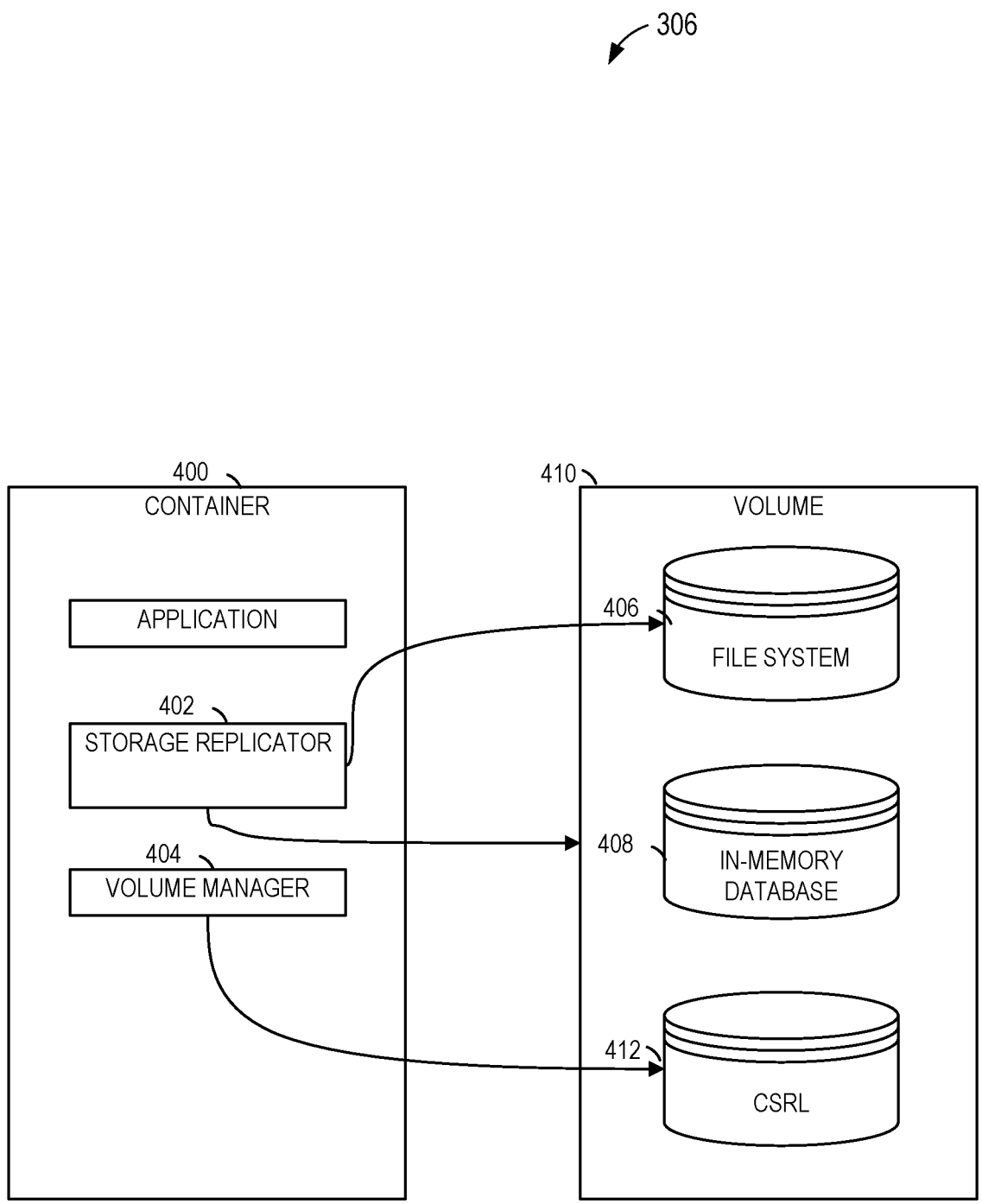
FIG. 4 is a block diagram illustrating a storage replicator and volume manager in more detail, in accordance with an example embodiment.

FIG. 4 is a block diagram illustrating a storage replicator and volume manager 306 in more detail, in accordance with an example embodiment. Here, the storage replicator and volume manager 306 maintains one or more containers 400. If a container 400 contains an in-memory database 312, such as a HANA database, storage replicator 402 and volume manager 404 will also be maintained in the container 400. The storage replicator 402 is able to control both a traditional file system 406 and an in-memory database 408 on a volume 410. Specifically, the in-memory database data is stored in the in-memory database 408 and other application files can be kept in the traditional file system 406. The volume manager 404 is able to control a container storage replication log (CSRL) 412 on the volume 410. All operations in the container 400 are recorded in the CSRL 412. This allows the storage replicator 402 to replicate updates from a primary container volume to a secondary container volume.

The storage replicator 402 and volume manager 404 may collectively be known as the container replicator. When a write is performed on a container volume with a replicated volume group, the container replicator copies the data into a kernel buffer on the primary container. The container replicator then writes a header and the data to the CSRL 412. The header describes the write. From the kernel buffer, the container replicator sends the write to all secondary containers and writes it to the primary data volume. Writing the data to the primary data volume may be performed asynchronously to avoid adding the penalty of a second full disk write to the overall write latency. Until the data volume write to the primary data volume is complete, the kernel buffer cannot be freed.

In synchronous mode, the volume replicator first sends the write to the secondary hosts and waits for a network acknowledgement that the write was received. When all secondary containers replicating in synchronous mode have acknowledged the write, the volume replicator notifies the primary container that the write is complete. The secondary data volume sends the network acknowledgement as soon as the write is received in the volume replicator kernel memory on the secondary data volume. The container does not need to wait for the full disk write, which improves performance. The data is subsequently written to the data volumes 410. When the write is completed on the secondary data volume(s), the volume replicator sends a data acknowledgement back to the primary data volume.

In asynchronous mode, the volume replicator notifies the container that the write is complete after it is written to the primary CSRL 412. Therefore, the write latency is only the time to write to the CSRL 412. The volume replicator then sends the write to the secondary container. The secondary data volume sends a network acknowledgement to the primary data volume as soon as the write is received in the volume kernel memory on the secondary data volume. When the write is completed on the secondary data volumes, the volume replicator sends a data acknowledgement back to the primary.

The application considers the write complete after receiving notification from the volume replicator that the data is written to the primary CSRL 412, and, for secondary container replicating in synchronous mode, that the write has been received in the kernel buffer. However, the volume replicator continues to track the write until the data acknowledgement is received from all the secondary containers. If the secondary container crashes before writing to the data volumes on the secondary data volume or the primary container crashes before it receives the data acknowledgement, the write can be replayed from the CSRL 412.

Figure 5:
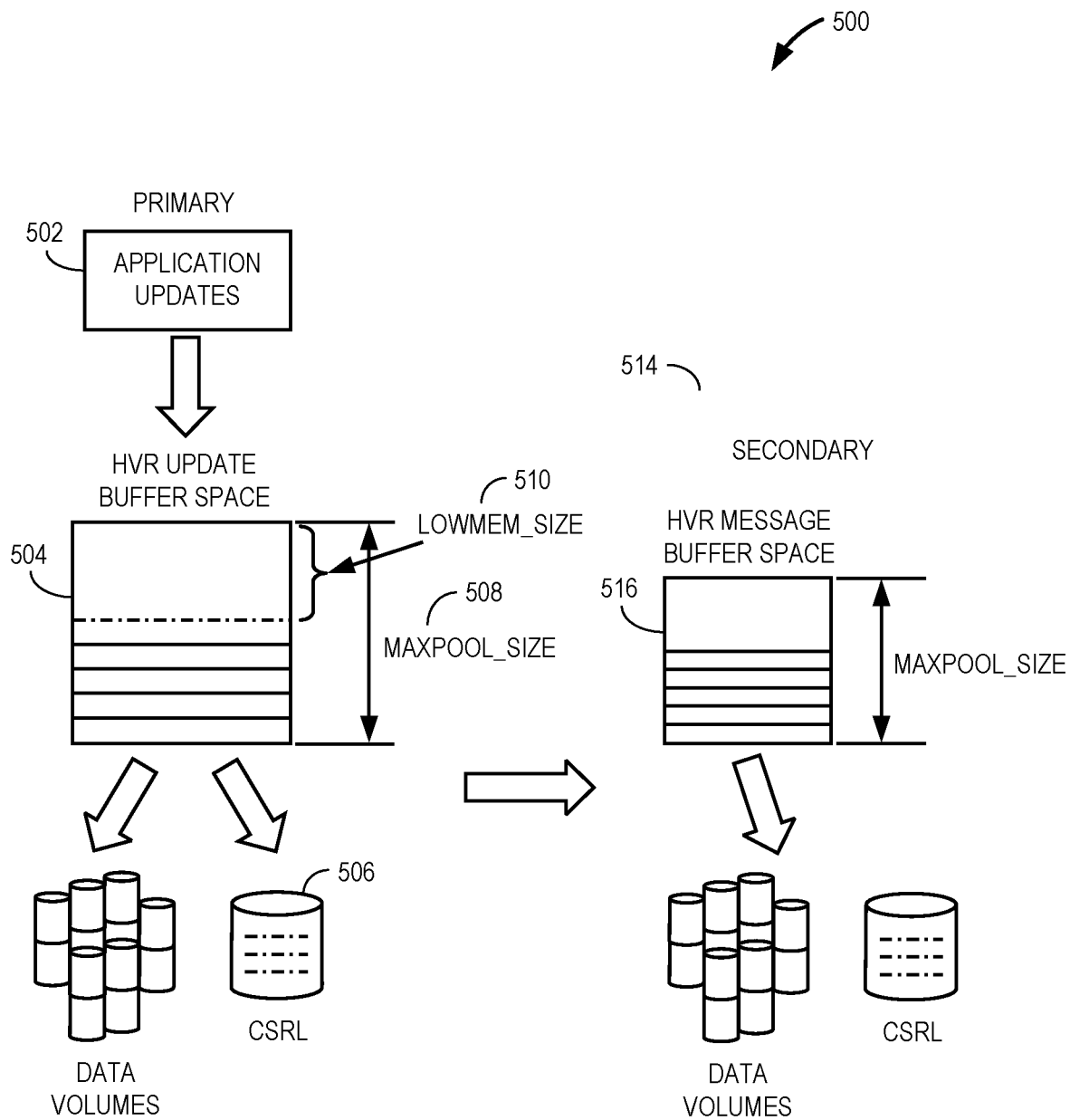
FIG. 5 is a block diagram illustrating a buffering process during an update of information, in accordance with an example embodiment.

FIG. 5 is a block diagram illustrating a buffering process 500 during an information update, in accordance with an example embodiment. Application updates 502 cause changes to the update buffer space 504. If the available update buffer space 504 is not sufficient to process the write request, writes are held up. Volume replication waits for current writes to complete and release the memory being used before processing new writes. Furthermore, when the update buffer space 504 is low, the volume replicator may free buffers early, causing the volume replication to read back the write from the CSRL 506. By setting the maxpool_size field 508 to be large enough to hold the incoming writes, the number of concurrent writes can be increased and the number of readbacks from the CSRL 506 can be decreased. When deciding whether or not a given write is freed early and read back later, the volume replicator looks at the amount of buffer space 504 available and frees the write if the amount is below a threshold defined by the tunable lowmem_size field 510. If this threshold is too low, it results in buffers being held for a long time. New writes are unable to be performed because of lack of buffer space 504. This all applies to the primary data volume 512. In the secondary data volume 514, the buffer space 516 is based primarily on the maxpool_size.

Figure 6:
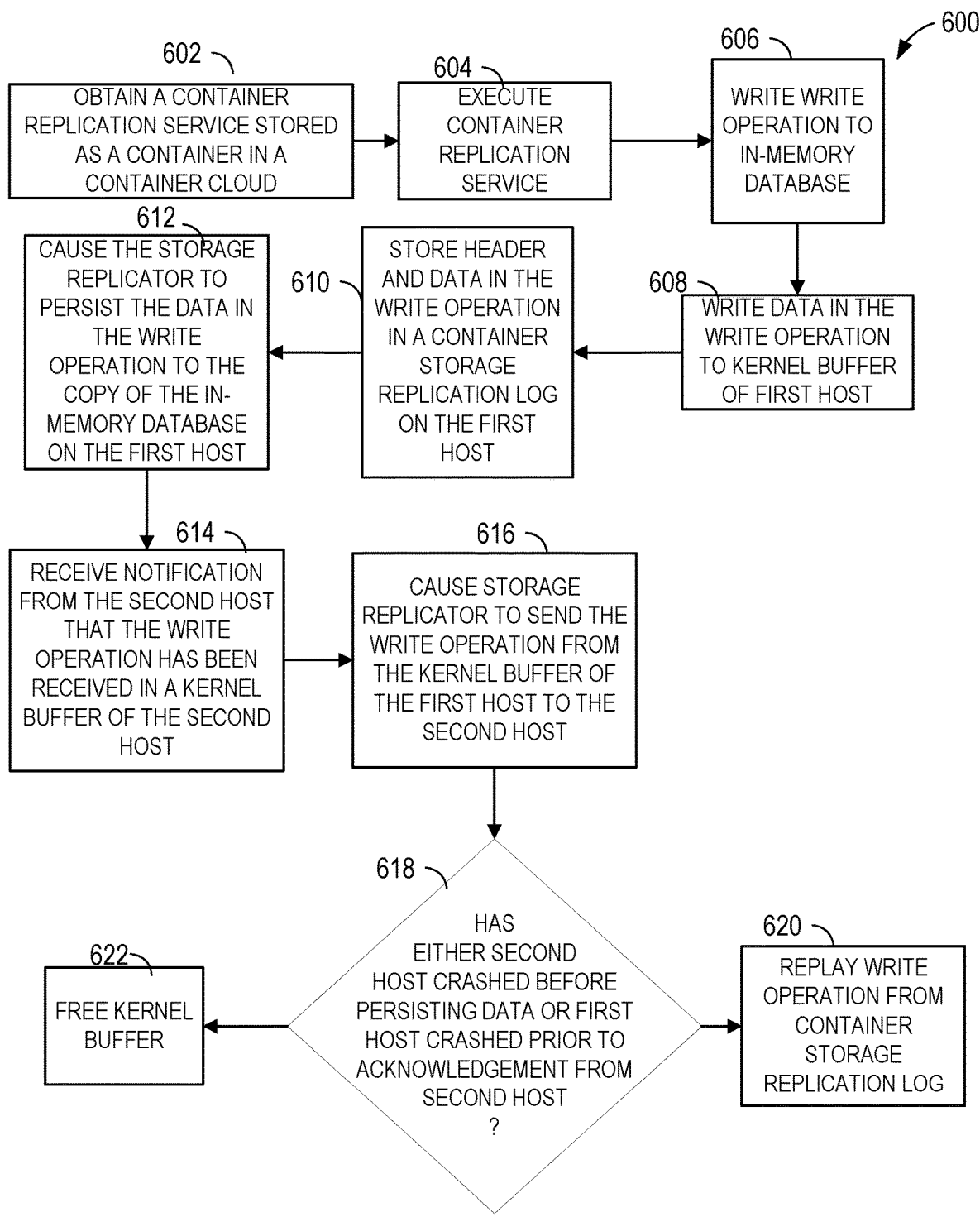
FIG. 6 is a flow diagram illustrating a method for replicating an in-memory database, in accordance with an example embodiment.

FIG. 6 is a flow diagram illustrating a method 600 for replicating an in-memory database 408, in accordance with an example embodiment. At operation 606, a container replication service stored as a container in a container cloud is obtained. The container cloud has a container microservice connected to the container, the container comprising a storage replicator 402 and a volume manager 404. At operation 604, the container replication service is executed, causing copies of an in-memory database 408 to be stored on both a first host and a second host. At operation 602, a write operation is written to the in-memory database 408. At operation 608, data in the write operation is written to a kernel buffer of the first host. At operation 610, a header and the data in the write operation are stored to a container storage replication log on the first host. At operation 612, the storage replicator is caused to persist the data in the write operation to the copy of the in-memory database on the first host. This may be performed asynchronously.

At operation 614, a notification is received from the second host that the write operation has been received in a kernel buffer of the second host. At operation 616, the storage replicator 402 is caused to send the write operation from the kernel buffer of the first host to the second host. At operation 618, it is determined whether either the second host has crashed before persisting the data from the write operation in the copy of the in-memory database 408 stored on the second host or that the first host has crashed prior to an acknowledgement being received from the second host that the second host has persisted the data from the write operation in the copy of the in-memory database 408 stored on the second host. If so, then at operation 620, the write operation is replayed from the container storage replication log. If not, then at operation 622, the kernel buffer is freed.

EXAMPLES

Example 1. A system comprising:
at least one hardware processor; and
a computer-readable medium storing instructions that, when executed by the at least one hardware processor, cause the at least one hardware processor to perform operations comprising:
 obtaining a container replication service stored as a container in a container cloud, the container cloud having a container microservice connected to the container, the container comprising a storage replicator and a volume manager;
 executing the container replication service to cause copies of an in-memory database to be stored on both a first host computer system and a second host computer system;
 receiving a write operation to the in-memory database;
 in response to the receiving:
  copying data in the write operation to a kernel buffer of the first host computer system;
  storing a header and the data in the write operation to a container storage replication log on the first host computer system;
  causing the storage replicator to send the write operation from the kernel buffer of the first host computer system to the second host computer system; and
  causing the storage replicator to persist the data in the write operation to the copy of the in-memory database on the first host computer system.

Example 2. The system of Example 1, wherein the causing the storage replicator to persist the data is performed asynchronously.

Example 3. The system of Examples 1 or 2, wherein the operations further comprise:
 freeing the kernel buffer once the persisting of the data in the write operation has been completed.

Example 4. The system of any of Examples 1-3, wherein the operations further comprise:
 receiving a notification from the second host computer system that the write operation has been received in a kernel buffer of the second host computer system.

Example 5. The system of Example 4, wherein the operations further comprise:
 in response to a determination that the second host computer system has crashed before persisting the data from the write operation in the copy of the in-memory database 408 stored on the second host computer system, replaying the write operation from the container storage replication log.

Example 6. The system of Example 4, wherein the operations further comprise:
 in response to a determination that the first host computer system has crashed prior to an acknowledgement being received from the second host computer system that the second host computer system has persisted the data from the write operation in the copy of the in-memory database 408 stored on the second host computer system, replaying the write operation from the container storage replication log.

Example 7. The system of any of Examples 1-6, wherein the operations further comprise:
 freeing the write operation from the kernel buffer of the first host computer system if space in the kernel buffer of the first host computer system is less than a predetermined threshold.

Example 8. A method comprising:
 obtaining a container replication service stored as a container in a container cloud, the container cloud having a container microservice connected to the container, the container comprising a storage replicator and a volume manager;
 executing the container replication service to cause copies of an in-memory database to be stored on both a first host computer system and a second host computer system;
 receiving a write operation to the in-memory database;
 in response to the receiving:
  copying data in the write operation to a kernel buffer of the first host computer system;
  storing a header and the data in the write operation to a container storage replication log on the first host computer system;
  causing the storage replicator to send the write operation from the kernel buffer of the first host computer system to the second host computer system; and
  causing the storage replicator to persist the data in the write operation to the copy of the in-memory database on the first host computer system.

Example 9. The method of Example 8, wherein the causing the storage replicator to persist the data is performed asynchronously.

Example 10. The method of Example 8 or 9, further comprising:
 freeing the kernel buffer once the persisting of the data in the write operation has been completed.

Example 11. The method of any of Examples 8-10, further comprising:
 receiving a notification from the second host computer system that the write operation has been received in a kernel buffer of the second host computer system.

Example 12. The method of Example 11, further comprising:
 in response to a determination that the second host computer system has crashed before persisting the data from the write operation in the copy of the in-memory database stored on the second host computer system, replaying the write operation from the container storage replication log.

Example 13. The method of Example 11, further comprising:

in response to a determination that the first host computer system has crashed prior to an acknowledgement being received from the second host computer system that the second host computer system has persisted the data from the write operation in the copy of the in-memory database stored on the second host computer system, replaying the write operation from the container storage replication log.

Example 14. The method of any Examples 1-13, further comprising:

freeing the write operation from the kernel buffer of the first host computer system if space in the kernel buffer of the first host computer system is less than a predetermined threshold.

Example 15. A non-transitory machine-readable medium storing instructions which, when executed by one or more processors, cause the one or more processors to perform operations comprising:

obtaining a container replication service stored as a container in a container cloud, the container cloud having a container microservice connected to the container, the container comprising a storage replicator and a volume manager;

executing the container replication service to cause copies of an in-memory database to be stored on both a first host computer system and a second host computer system;

receiving a write operation to the in-memory database;

in response to the receiving:

copying data in the write operation to a kernel buffer of the first host computer system;

storing a header and the data in the write operation to a container storage replication log on the first host computer system;

causing the storage replicator to send the write operation from the kernel buffer of the first host computer system to the second host computer system; and causing the storage replicator to persist the data in the write operation to the copy of the in-memory database 408 on the first host computer system.

Example 16. The non-transitory machine-readable medium of Example 15, wherein the causing the storage replicator to persist the data is performed asynchronously.

Example 17. The non-transitory machine-readable medium of Examples 15 or 16, wherein the operations further comprise:

freeing the kernel buffer once the persisting of the data in the write operation has been completed.

Example 18. The non-transitory machine-readable medium of any of Examples 15-17, wherein the operations further comprise:

receiving a notification from the second host computer system that the write operation has been received in a kernel buffer of the second host computer system.

Example 19. The non-transitory machine-readable medium of Example 18, wherein the operations further comprise:

in response to a determination that the second host computer system has crashed before persisting the data from the write operation in the copy of the in-memory database stored on the second host computer system, replaying the write operation from the container storage replication log.

Example 20. The non-transitory machine-readable medium of Example 18, wherein the operations further comprise:

in response to a determination that the first host computer system has crashed prior to an acknowledgement being received from the second host computer system that the second host computer system has persisted the data from the write operation in the copy of the in-memory database stored on the second host computer system, replaying the write operation from the container storage replication log.

Figure 7:
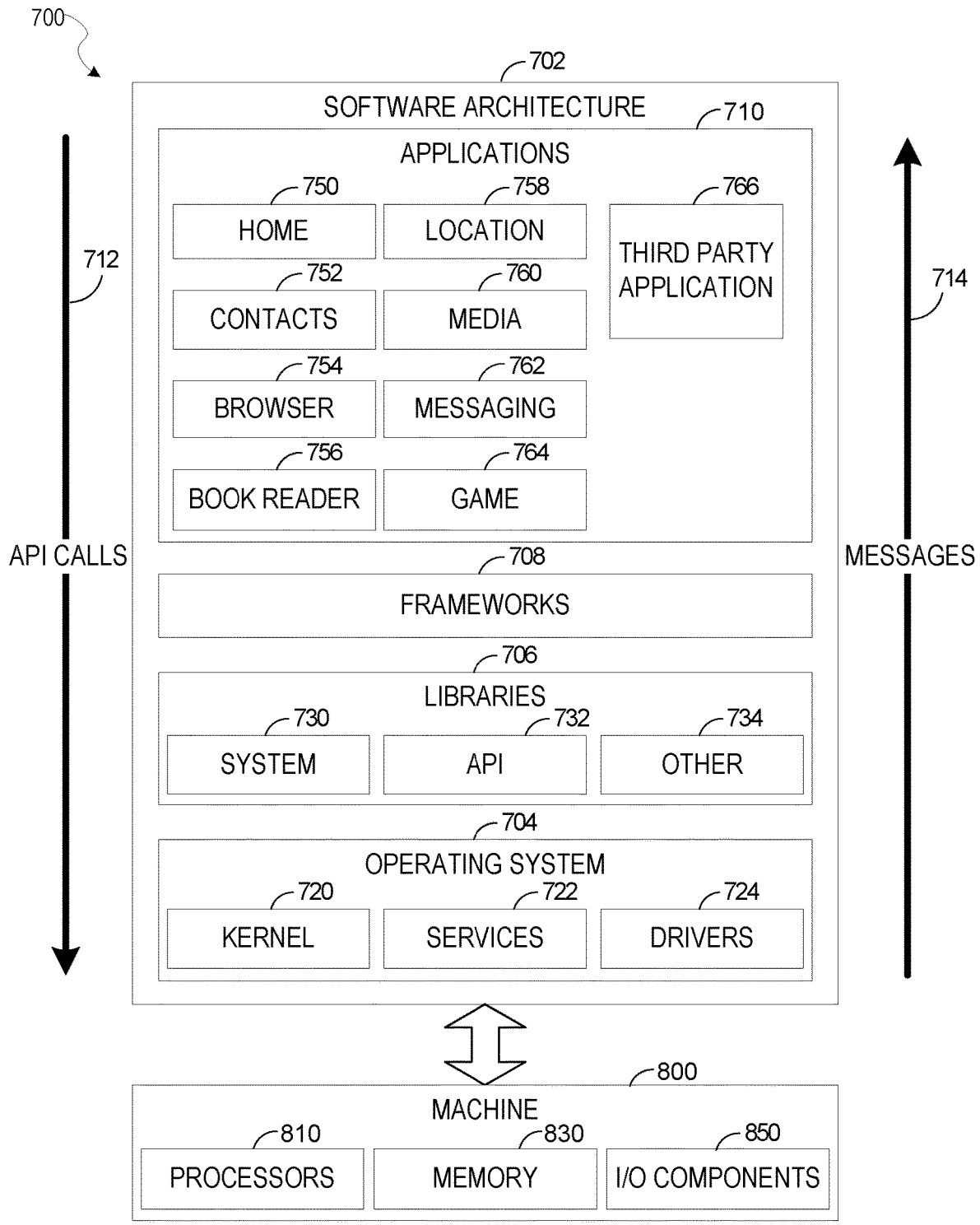
FIG. 7 is a block diagram illustrating an architecture of software, which can be installed on any one or more of the devices described above.

FIG. 7 is a block diagram 700 illustrating an architecture of software 702, which can be installed on any one or more of the devices described above. FIG. 7 is merely a non-limiting example of a software architecture, and it will be appreciated that many other architectures can be implemented to facilitate the functionality described herein. In various embodiments, the software 702 is implemented by hardware such as a machine 800 of FIG. 8 that includes processors 810, memory 830, and input/output (I/O) components 850. In this example architecture, the software 702 can be conceptualized as a stack of layers where each layer may provide a particular functionality. For example, the software 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
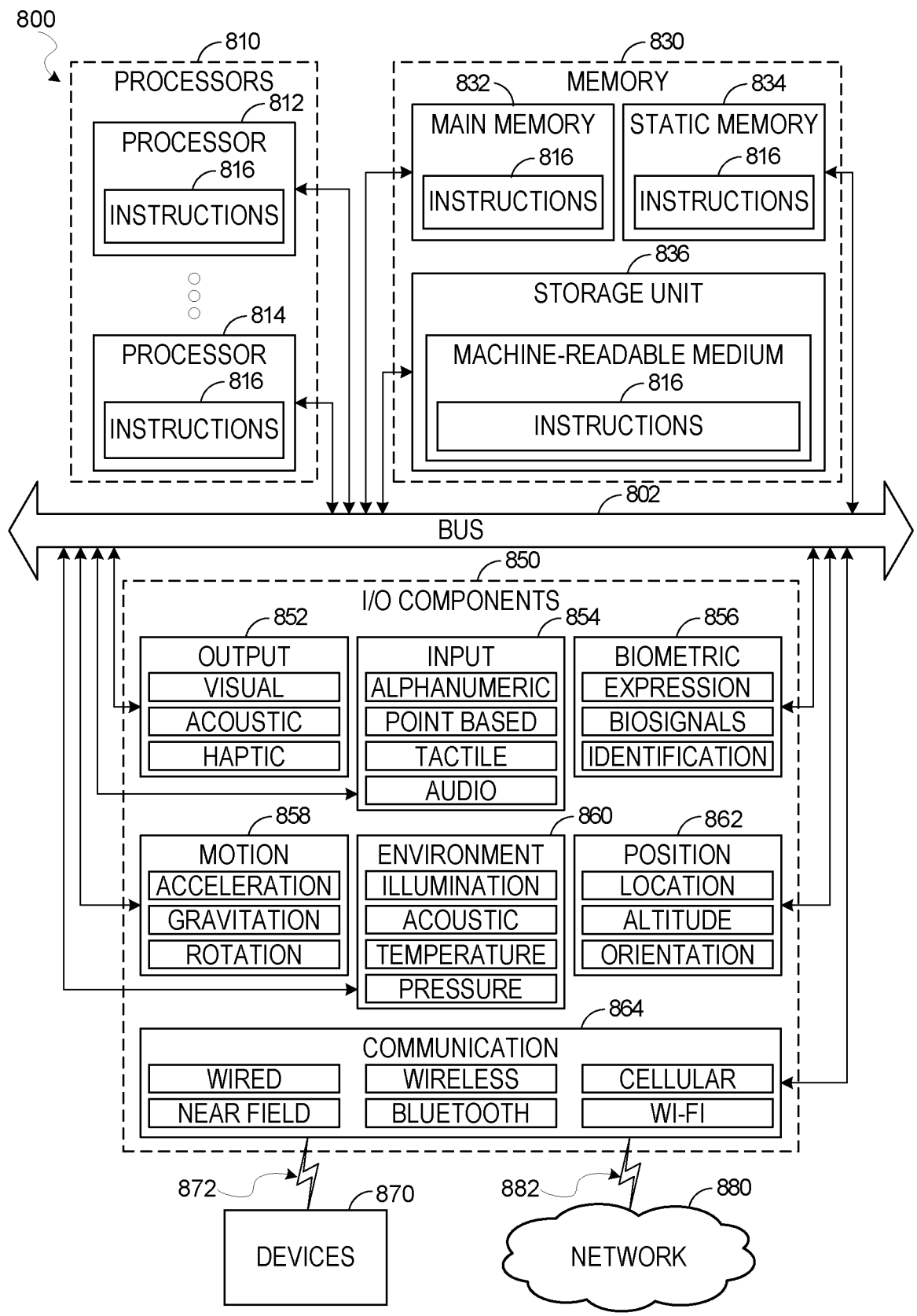
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method 600 of FIG. 6. Additionally, or alternatively, the instructions 816 may implement FIGS. 1-5 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 8140 or devices 870 via a coupling 8142 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to processors 810. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 8140 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   causing copies of a database to be stored on both a first host computer system and a second host computer system;
   receiving a write operation to the database; and
   in response to the receiving:
   copying data in the write operation to a kernel buffer of the first host computer system;
   causing a service to send the write operation from the kernel buffer of the first host computer system to the second host computer system; and
   causing the service to persist the data in the write operation to the copy of the database on the first host computer system.

2. The system of claim 1, wherein the database is an in-memory database.

3. The system of claim 1, wherein the operations further comprise:
   holding up the write operation by delaying execution of the copying of the data in the write operation if space in the kernel buffer of the first host computer system is less than a predetermined threshold.

4. The system of claim 1, wherein the causing the service to persist the data is performed asynchronously.

5. The system of claim 1, wherein the operations further comprise:
   freeing the kernel buffer once the persisting of the data in the write operation has been completed.

6. The system of claim 1, wherein the operations further comprise:
   receiving a notification from the second host computer system that the write operation has been received in a kernel buffer of the second host computer system.

7. The system of claim 6, wherein the operations further comprise:
   in response to a determination that the second host computer system has crashed before persisting the data from the write operation in a copy of the database stored on the second host computer system, replaying the write operation from a replication log.

8. The system of claim 7, wherein the operations further comprise:
   in response to a determination that the first host computer system has crashed prior to an acknowledgement being received from the second host computer system that the second host computer system has persisted the data from the write operation in a copy of the database stored on the second host computer system, replaying the write operation from the replication log.

9. The system of claim 1, wherein the operations further comprise:
   freeing the write operation from the kernel buffer of the first host computer system if space in the kernel buffer of the first host computer system is less than a predetermined threshold.

10. A method comprising:
    causing copies of a database to be stored on both a first host computer system and a second host computer system;
    receiving a write operation to the database; and
    in response to the receiving:
    copying data in the write operation to a kernel buffer of the first host computer system;
    causing a service to send the write operation from the kernel buffer of the first host computer system to the second host computer system; and
    causing the service to persist the data in the write operation to the copy of the database on the first host computer system.

11. The method of claim 10, wherein the database is an in-memory database.

12. The method of claim 10, further comprising:
    holding up the write operation by delaying execution of the copying of the data in the write operation if space in the kernel buffer of the first host computer system is less than a predetermined threshold.

13. The method of claim 10, wherein the causing the service to persist the data is performed asynchronously.

14. The method of claim 10, further comprising:
    freeing the kernel buffer once the persisting of the data in the write operation has been completed.

15. The method of claim 10, further comprising:
    receiving a notification from the second host computer system that the write operation has been received in a kernel buffer of the second host computer system.

16. The method of claim 15, further comprising:
    in response to a determination that the second host computer system has crashed before persisting the data from the write operation in a copy of the database stored on the second host computer system, replaying the write operation from a replication log.

17. The method of claim 16, further comprising:
    in response to a determination that the first host computer system has crashed prior to an acknowledgement being received from the second host computer system that the second host computer system has persisted the data from the write operation in a copy of the database stored on the second host computer system, replaying the write operation from the replication log.

18. The method of claim 10, further comprising:
freeing the write operation from the kernel buffer of the first host computer system if space in the kernel buffer of the first host computer system is less than a predetermined threshold.

19. A non-transitory machine-readable medium storing instructions which, when executed by one or more processors, cause the one or more processors to perform operations comprising:
causing copies of a database to be stored on both a first host computer system and a second host computer system;
receiving a write operation to the database; and
in response to the receiving:
copying data in the write operation to a kernel buffer of the first host computer system;
causing a service to send the write operation from the kernel buffer of the first host computer system to the second host computer system; and
causing the service to persist the data in the write operation to the copy of the database on the first host computer system.

20. The non-transitory machine-readable medium of claim 19, wherein the database is an in-memory database.

* * * * *